United States Patent Office 3,560,122
Patented Feb. 2, 1971

3,560,122
CANDLE CONTAINING WICK OF
NOVEL COMPOSITION
Richard D. Cassar, West Chester, Pa., assignor to Sun Oil
Company, Philadelphia, Pa., a corporation of New
Jersey
No Drawing. Filed July 9, 1969, Ser. No. 840,531
Int. Cl. F23d 13/16
U.S. Cl. 431—288                         3 Claims

ABSTRACT OF THE DISCLOSURE

A candle wick having the composition defined herein, and whose cross-sectional area when compared to the cross-sectional area of the candle it is contained in has a ratio between 0.042 and 0.250, is useful in place of the costly and difficult-to-make cotton wicks used in candles. The wick composition comprises 65 to 98.8 weight percent paraffin wax, 0.1 to 10 weight percent palygorskite particles and 1.1 to 25 weight percent of polyethylene having a weight average molecular weight in the range of 500,000 to 6,000,000, the latter two being uniformly distributed in the wax.

CROSS REFERENCE TO RELATED APPLICATION

This invention concerns a novel use of the composition described in a realted application Cassar application Ser. No. 840,532, filed the same date as this application.

BACKGROUND OF THE INVENTION

The invention relates to candle having an inexpensive candle wick of novel composition in place of a conventional cotton candle wick. More specifically the invention relates to a candle containing a centrally located wick wherein the ratio of the cross-sectional area of the wick to the cross-sectional area of the candle is between 0.042 and 0.250. The composition of said wick comprises paraffin wax, palygorskite particles, and polyethylene having a weight average molecular weight in the range of 500,000 to 6,000,000, the latter two being uniformly distributed throughout the wax. The weight percent of each material is defined herein. There heretoforementioned polyethylene is also referred to herein for convenience as "USMW PE."

Much of the effort in attempting to improve the performance of candles has been directed towards improvements in the performance of cotton wicks. In Kirk and Othmer, Encyclopedia of Chemical Technology, second edition, volume 4, under "Candles" is a detailed description of the complex art involved in preparing a satisfactory wick. Birefly selected cotton yarn of certain physical properties is interwoven or plaited into a wick. This plaited wick is boiled in a weak alkali solution, bleached with chlorine or a chlorine-containing solution with hydrochloric acid and washed with clean water. Excess water is removed. A specifically prepared chemical solution is applied to the wick. After the water is removed the salts remaining improve the burning characteristics of the wick and when the flame is extinguished prevents afterglow and smouldering. After soaking or boiling in the aqueous chemical solution, the composition of which varies greatly, depending upon the manufacturer, the wick is removed, dried and inspected. The wick is then wound on spools for use.

Consequently, an inexpensive substitute which can be used in place of the heretoforementioned difficult-to-make and expensive cotton wicks in candles is highly desirable.

SUMMARY OF THE INVENTION

The present invention is a candle containing a wick wherein the ratio of the cross-sectional area of the wick to the cross-sectional area of the candle is between 0.042 and 0.250. The composition of said wick comprises 65 to 98.8 weight percent paraffin wax, 0.1 to 10 weight percent of palygorskite particles and 1.1 to 25 weight percent of UHMW PE. The particles and the UHMW PE are uniformly distributed throughout the wax. The wick of said composition can be incorporated into a candle by any number of known techniques.

DESCRIPTION

Paraffin waxes are available with a wide range of physical properties, for example, melting points may be as low as 100° F. (AMP) or as high as 160° F. (AMP). These waxes can be used in this invention. Waxes which are commercially available and would be more generally used are those having a melting point between 127° F. (AMP) and 156° F. (AMP). Other physical properties of these latter waxes are: a penetration at 77° F. of from 9 to 33 (ASTM D–1321), SUS viscosity at 210° F. of from 37.2 to 44.8 (ASTM D–446), and oil content of from 0.2 to 3.0 (ASTM D–721). AMP refers to the American melting point which is an arbitrary figure 3° F. higher than the ASTM melting point.

Polyethylenes are available with a wide range of molecular weights. These molecular weights have a substantial effect on the properties of the polyethylene. For example a polyethylene with a molecular weight of 1500 is a waxy solid while a polyethylene with a molecular weight of 1,500,000 is a hard, extremely tough solid. As discussed herein molecular weight refers to weight average molecular weight determined by light scattering or solution viscosity or melt viscosity.

In the synthesis of polyethylene, not all the molecules grow to the same size. The actual size variation depends upon the polymerization employed. Consequently, while the molecular weight of the UHMW PE referred to in the examples herein is stated as being 1,500,000, there are in fact individual molecules in the UHMW PE with molecular weights lower than 1,500,000 and even lower than 1,000,000. Sometimes, the individual molecules have molecular weights as low as 500,000. Also in the same 1,500,000 weight average molecular weight polyethylene there are in fact individual molecules with molecular weights greater than 2,000,000, sometimes the individual molecules have molecular weights as high as 3,000,000, or even as high as 6,000,000. Thus the polyethylene used in this invention can have a weight average molecular weight in the range of 500,000 to 6,000,000.

The palygorskite particles are available in a wide range of particle sizes. However if the particles are too large the result is an extremely nonuniform composition. Thus some relatively smaller size must be used. While particles capable of passing through a 32 mesh Tyler screen can be used it is preferred that the particles be finer, e.g., capable of passing through a 60 mesh Tyler screen. Specific examples of palygorskite are attapulgite and sepiolite. These minerals are defined in Kirk and Othmer, Encyclopedia of Chemical Technology, second edition, volume 5, "Clays."

The amount of palygorskite particles used in the formulation can very depending on the particular type of mineral and the average particle size and the particle size distribution. In the examples used for illustrative purposes 5% by weight of attapulgite was used. Generally the amount of particles in the combination will range from 0.1 to 10% by weight.

In order to obtain a satisfactory wick the UHMW PE and particles must be uniformly distributed throughout the wax. One way of achieving this uniform distribution is to add the UHMW PE as a powder and the particles, either together or separately in any sequence, to agitated molten wax, maintained at a temperature below the melting point of the UHMW PE and then allow the combination to solidify while being agitated. A preferred way of achieving this uniform distribution of additives in the wax is as follows. UHMW PE powder is added rapidly to the agitated molten wax containing the particles and maintained at a temperature above the melting point of the UHMW PE. As soon as the polyethylene gels the wax, the mass is allowed to cool without agitation.

After the combination of the wax, UHMW PE and the particles is prepared it can be formed into the desired shaped wick by any one of several means. For example, a circular wick can be easily formed by extrusion of either the molten formulation or solid pieces of the formulation. For illustrative purposes the wicks used in the examples were prepared by compression molding. Other means of forming the wick include casting and other types of molding.

The wick can be incorporated into the candle by any number of techniques. Thus a candle can be molded having a hollow center, the diameter of which is just sufficient for an extruded circular wick to be inserted.

Surprisingly the size of the wick used comprising the composition defined herein depends on the size of the candle. That is to say, the cross-sectional area of the wick used depends on the cross-sectional area of the candle the wick is used in. Thus the size of the formed wick used depends on the size of the body of the candle. For example, a ⅛ inch diameter cylindrical wick prepared from the formulation defined herein by itself is easily ignited and burns in a highly satisfactory manner. However if the same ⅛ inch diameter cylindrical wick is placed in a 3 inch diameter cylindrical body of wax having a ⅛ inch diameter hole located in its center a different result occurs. The wick in this candle will ignite but almost immediately thereafter it will go out. Yet a satisfactory candle is obtained by taking a 3/16 inch circular wick made from the formulation defined herein and placing it centrally within a 1 inch diameter body of wax. Thus in the former case, when the ratio of cross-sectional area of wick to the cross-sectional area of candle was 0.0418, the candle would not stay lit. In the latter case, when the ratio of cross-sectional areas was 0.1875, the candle worked satisfactorily. Thus a minimum ratio of cross-sectional area of the wick used in a candle to the cross-sectional area of the body of the candle must be obtained in order to use a wick prepared from the formulation defined here. However, as the cross-sectional area of the wick increases relative to the cross-sectional area of the candle the bottom of the flame tends to spread across the top of the candle. The disadvantage of this is that as the bottom of the flame spreads the shape of the flame more and more departs from the conventional shape of a candle flame. To control the tendency of the bottom of the flame to extend across the top of the candle the ratio of cross-sectional area of the wick used in the candle to the cross-sectional area of the candle must be less than 0.50. Thus it is distinctly preferable that this ratio of cross-sectional areas be between 0.042 and 0.25.

EXAMPLES

A typical parrafin wax, used herein for illustrative purposes, has a melting point of 127° F. (AMP), a viscosity at 210° F. of 43.6 SUS, a penetration at 77° F. of 33 (ASTM D–1321) and an oil content of 0.5% (ASTM D–721). A typical UHMW PE, used herein for illustrative purposes has a weight average molecular weight of 1,500,000; a specific gravity of 0.94 (ASTM D–792), a crystalline melt point of 275° F. as determined by differential thermal analysis and a nil melt index (ASTM D-1238). The palygorskite particles used herein for illustrative purposes was attapulgite. The particles of the latter were capable of passing through a 60 mesh Tyler screen. A typical chemical analysis of attapulgite yields about 55% $SiO_2$, 10.2% $Al_2O_3$, 3.5% $Fe_2O_3$, 10.5% MgO, 0.5% $K_2O$, and about 19.8% $H_2O$ removed at an elevated temperature; 99.5% total.

The compounding of the paraffin wax, UHMW PE, and clay particles was performed in the following manner. The paraffin wax was melted in a suitable container. The temperature of the molten wax was maintained at a few degrees above the melting point of the UHMW PE. The desired amount of attapulgite was added to the molten wax. While the molten wax and attapulgite mixture was being agitated the desired amount of UHMW PE powder was rapidly added. Soon thereafter the polyethylene gels the wax. After this gelation, the combination, without agitation, was allowed to solidify.

The heretofore prepared composition was compression molded into two long circular wicks. One wick has a diameter of 0.125 inch, and the other wick had a diameter of 0.1875 inch. Both of these wicks were easily ignited and remained ignited until completely consumed.

Various diameter wax candles were prepared from a paraffin wax having a melting point 145° F. (AMP), a viscosity at 210° F. of 40 SUS, a penetration at 77° F. of 9 (ASTM D–1321).

A hole was drilled in the center of each wax candle. The proper size wick was inserted in the hole of the body of wax. The test results on these various combinations of wick sizes and wax candle sizes are shown in the following table.

TABLE

| | | | | | |
|---|---|---|---|---|---|
| Diameter of wick, inch | 0.125 | None | 0.125 | 0.125 | 0.1875 |
| Diameter of candle, inches | | 1.0 | 1.0 | 3.0 | 1.0 |
| Ratio of diameter of wick to diameter of candle | | | 0.125 | 0.0417 | 0.1875 |
| Once ignited does it stay ignited | Yes | (¹) | Yes | No | Yes |

¹ Cannot ignite.

Thus a 0.125 inch wick of the formulation defined herein ignited easily and stayed ignited. A one inch diameter candle could not be ignited by a match. When a wick with a 0.125 inch diameter was placed in a one inch diameter candle the wick was easily ignited and remained ignited until the entire body of wax was consumed. However when the same diameter wick was placed in a much larger body of wax—a candle with a 3 inch diameter—the wick could be ignited but would not stay ignited. A wick of 0.1875 inch diameter also worked satisfactorily in a 1.0 inch diameter candle.

The invention claimed is:
1. A candle containing a centrally located wick wherein the ratio of the cross-sectional area of the wick to the cross-sectional area of the candle is between 0.042 and 0.250; the composition of said wick comprising paraffin wax having uniformly distributed therein:
   (a) an amount of polyethylene constituting between 1.1 and 25 weight percent of the composition and sufficient to facilitate ignitability, said polyethylene having a weight average molecular weight in the range of 500,000 to 6,000,000; and
   (b) an amount of palygorskite particles constituting between 0.1 to 10 weight percent of the composition and sufficient to insure uniform distribution of the polyethylene in the wax, said particles being capable of passing through a 32 mesh Tyler screen.
2. A composition according to claim 1 wherein the wax has a melting point between 127° F. and 156° F. (AMP).
3. A composition according to claim 1 wherein the palygorskite is attapulgite.

References Cited

UNITED STATES PATENTS 1,572,909  2/1926  Von Porten _____ 44—16X
2,745,271  5/1956  Walker _____ 431—288

CARROLL B. DORITY, Jr., Primary Examiner

U.S. Cl. X.R.

44—7.5